United States Patent
Lamb, Jr. et al.

(10) Patent No.: US 11,772,783 B2
(45) Date of Patent: Oct. 3, 2023

(54) TURBINE ENGINE SECONDARY EJECTOR SYSTEM

(71) Applicant: LOCKHEED MARTIN CORPORATION, Bethesda, MD (US)

(72) Inventors: Donald W. Lamb, Jr., North Haven, CT (US); Patrick Ormande Bowles, Glastonbury, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 99 days.

(21) Appl. No.: 16/877,569

(22) Filed: May 19, 2020

(65) Prior Publication Data

US 2021/0362843 A1   Nov. 25, 2021

(51) Int. Cl.
| | |
|---|---|
| *B64C 27/10* | (2023.01) |
| *B64C 27/18* | (2006.01) |
| *B64D 33/04* | (2006.01) |
| *B64C 27/82* | (2006.01) |

(52) U.S. Cl.
CPC .............. *B64C 27/10* (2013.01); *B64C 27/18* (2013.01); *B64D 33/04* (2013.01); *B64C 2027/8236* (2013.01); *F05B 2260/601* (2013.01); *F05D 2220/323* (2013.01); *F05D 2220/329* (2013.01)

(58) Field of Classification Search
CPC .. B64D 33/04; B64D 33/06; B64D 2033/045; B64D 33/045; B64D 2233/045; B64C 27/10; B64C 27/18; B64C 2027/8236; F05B 2260/601; F05D 2220/323; F05D 2220/329
See application file for complete search history.

(56) References Cited

U.S. PATENT DOCUMENTS

| | | | | | |
|---|---|---|---|---|---|
| 3,613,826 | A | * | 10/1971 | Cabassut ................. | F02K 1/383 181/219 |
| 3,695,387 | A | * | 10/1972 | Hilbig ..................... | F02K 1/383 239/265.41 |
| 4,095,417 | A | * | 6/1978 | Banthin .................. | F02K 1/825 239/265.17 |
| 5,154,052 | A | * | 10/1992 | Giffin, III ............... | F02K 1/62 60/262 |
| 5,826,794 | A | * | 10/1998 | Rudolph ................. | F02K 1/383 239/265.17 |
| 6,966,175 | B2 | * | 11/2005 | Lair ......................... | F02K 1/28 60/770 |
| 7,284,364 | B2 | * | 10/2007 | Means .................... | F01N 13/082 60/264 |
| 8,403,629 | B2 | * | 3/2013 | Lundbladh .............. | F02K 1/46 415/117 |
| 9,273,728 | B2 | * | 3/2016 | Tate ....................... | F16C 33/586 |
| 9,297,334 | B2 | * | 3/2016 | Alhatim .................. | F02K 1/30 |
| 9,879,636 | B2 | * | 1/2018 | Alhatim .................. | F02K 1/28 |
| 9,920,710 | B2 | * | 3/2018 | Dawson .................. | F02K 3/025 |
| 9,926,809 | B2 | * | 3/2018 | Ammon .................. | F01D 25/30 |
| 10,400,710 | B2 | * | 9/2019 | Dawson .................. | F02K 3/075 |

(Continued)

*Primary Examiner* — Medhat Badawi
(74) *Attorney, Agent, or Firm* — Foley & Lardner LLP (57) ABSTRACT

According to an aspect, an ejector member includes an annular member; a vent arranged at the annular member, the vent having an inlet at a first surface of the annular member, the vent further having an outlet arranged radially inward from a second surface of the annular member; and a vane extending radially inward from the second surface of the annular member.

20 Claims, 6 Drawing Sheets

(56) References Cited

U.S. PATENT DOCUMENTS

| | | | |
|---|---|---|---|
| 10,718,229 B2* | 7/2020 | Froemming | F01D 17/167 |
| 11,434,018 B1* | 9/2022 | Stangl | F02C 7/042 |
| 2016/0258358 A1* | 9/2016 | Kazlauskas | F01D 25/30 |
| 2018/0100468 A1* | 4/2018 | Sutterfield | F02K 1/82 |
| 2019/0127072 A1* | 5/2019 | Van Keuren | B64C 7/00 |
| 2020/0024983 A1* | 1/2020 | Simonetti | F02K 1/46 |
| 2021/0362843 A1* | 11/2021 | Lamb, Jr. | B64C 27/10 |
| 2022/0364475 A1* | 11/2022 | Tableau | F01D 5/282 |

* cited by examiner

TURBINE ENGINE SECONDARY EJECTOR SYSTEM

STATEMENT OF FEDERAL SUPPORT

This invention was made with government support under N00019-06-C-0081 awarded by the US Navy. The government has certain rights in the invention.

BACKGROUND

Exemplary embodiments relate to turbine engine exhaust systems, and more particularly, to a turbine engine secondary flow ejector system.

Turbine engine systems receive air from outside of an aircraft. A primary portion of the cooling air is channeled toward a core of an engine, where the fuel is injected and ignited. A secondary portion of the air is channeled to bypass the core. The bypassing air and the core air are both expelled toward an exhaust duct. The bypassing air interacts with the core air in the exhaust duct, which reduces the temperature in the exhaust duct and reduces engine noise. However, the interaction also results in a disruption of an overall flow of the air in the exhaust duct.

Conventional turbine engine systems add a secondary flow ejector gap around the core exhaust, which pulls the engine bay flow toward the exhaust duct. Conventional turbine engine systems also add a deswirl system to maximize the secondary flow of air being released into the exhaust duct. However, even with a deswirl system, expelled hot air may be pulled back from the exhaust duct and flow toward the engine bay.

BRIEF DESCRIPTION

According to one embodiment, an ejector member includes an annular member; a vent arranged at the annular member, the vent having an inlet at a first surface of the annular member, the vent further having an outlet arranged radially inward from a second surface of the annular member; and a vane extending radially inward from the second surface of the annular member.

In addition to one or more of the features described above or below, or as an alternative, the ejector member further comprises a plurality of vents.

In addition to one or more of the features described above or below, or as an alternative, the ejector member further comprises a plurality of vanes.

In addition to one or more of the features described above or below, or as an alternative, each vent of the plurality of vents has a respective curved surface profile.

In addition to one or more of the features described above or below, or as an alternative, each vent of the plurality of vents has an angled surface profile.

In addition to one or more of the features described above or below, or as an alternative, at least one vane of the plurality of vanes is arranged between a first vent and a second vent.

In addition to one or more of the features described above or below, or as an alternative, the annular member comprises an exhaust duct.

According to another embodiment, an ejector assembly includes an engine exhaust frame having a first casing and a second casing spaced apart and radially outward from the first casing; an annular member attached to the second casing; a plurality of vents arranged at the annular member, each vent having an inlet at a first surface of the annular member, each vent further having an outlet arranged radially inward from a second surface of the annular member; and a plurality of vanes extending radially inward from the second surface of the annular member.

In addition to one or more of the features described above or below, or as an alternative, the second casing has a tube-shaped body that extends along and is coaxial with a longitudinal axis of the engine exhaust frame.

In addition to one or more of the features described above or below, or as an alternative, the first casing has a tube-shaped body that extends along and is coaxial with the longitudinal axis of the engine exhaust frame.

In addition to one or more of the features described above or below, or as an alternative, the annular member comprises an exhaust duct.

In addition to one or more of the features described above or below, or as an alternative, each vane of the plurality of vanes is attached to the first casing.

In addition to one or more of the features described above or below, or as an alternative, the ejector assembly further includes a hub connected to the first casing.

According to yet another embodiment a rotary-wing aircraft includes a rotor; a turbine engine for driving the rotor; an exhaust system for receiving an exhaust from the turbine engine; the exhaust system comprising: an engine exhaust frame; and an engine exhaust frame having a first casing and a second casing spaced apart and radially outward from the first casing; an annular member attached to the second casing; a plurality of vents arranged at the annular member, each vent having an inlet at a first surface of the annular member, each vent further having an outlet arranged radially inward from a second surface of the annular member; a plurality of vanes extending radially inward from the second surface of the annular member.

In addition to one or more of the features described above or below, or as an alternative, the second casing has a tube-shaped body that extends along and is coaxial with a longitudinal axis of the engine exhaust frame.

In addition to one or more of the features described above or below, or as an alternative, the first casing has a tube-shaped body that extends along and is coaxial with the longitudinal axis of the engine exhaust frame.

In addition to one or more of the features described above or below, or as an alternative, each vent of the plurality of vents is arranged equidistant from an adjacent vent.

In addition to one or more of the features described above or below, or as an alternative, the annular member comprises an exhaust duct.

In addition to one or more of the features described above or below, or as an alternative, the exhaust system further includes a barrier mechanism operable to block the outlet hole.

In addition to one or more of the features described above or below, or as an alternative, the rotary-wing aircraft, further includes a translational thrust system; and a propeller rotor operable to be driven by the turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures.

Figure 1:
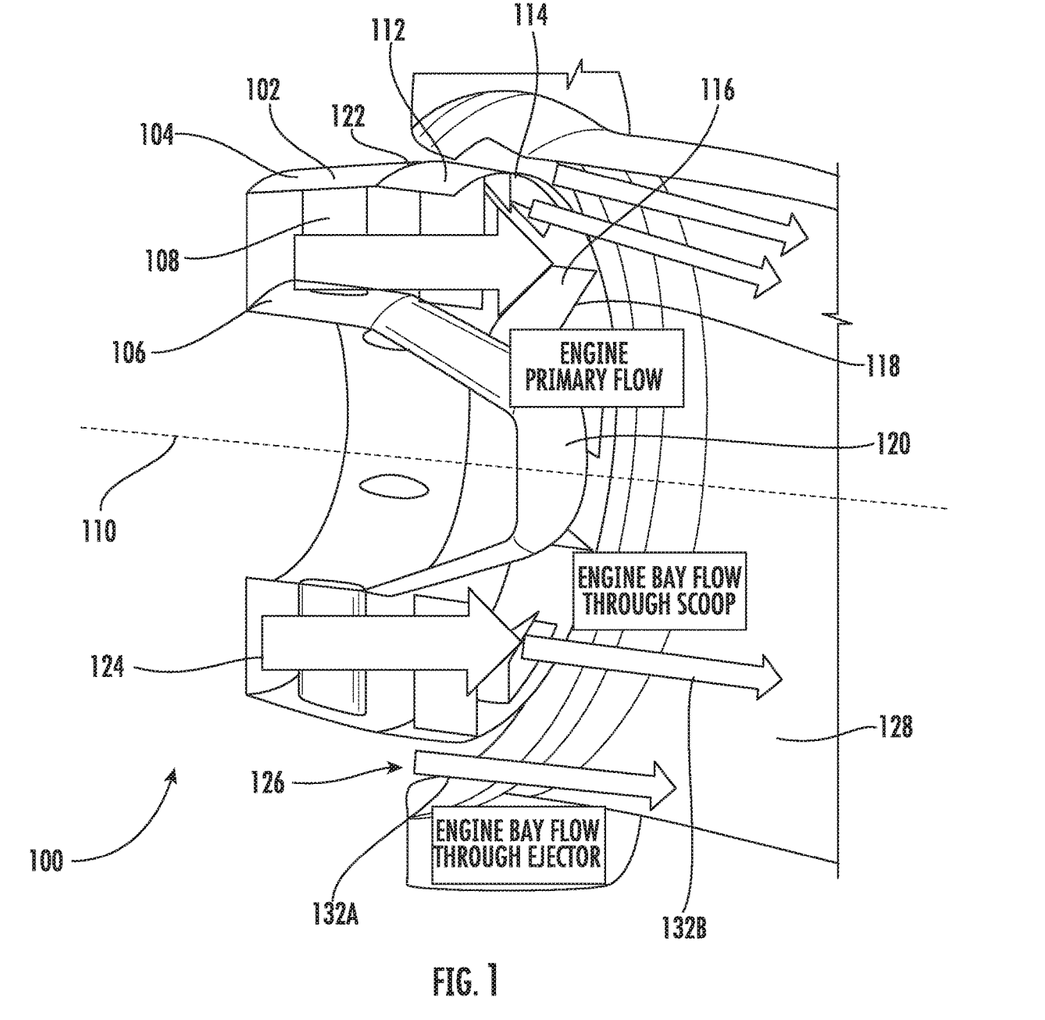
FIG. 1 depicts a cross-sectional view of an exhaust assembly for a turbine engine in accordance with an exemplary embodiment.
Figure 2:
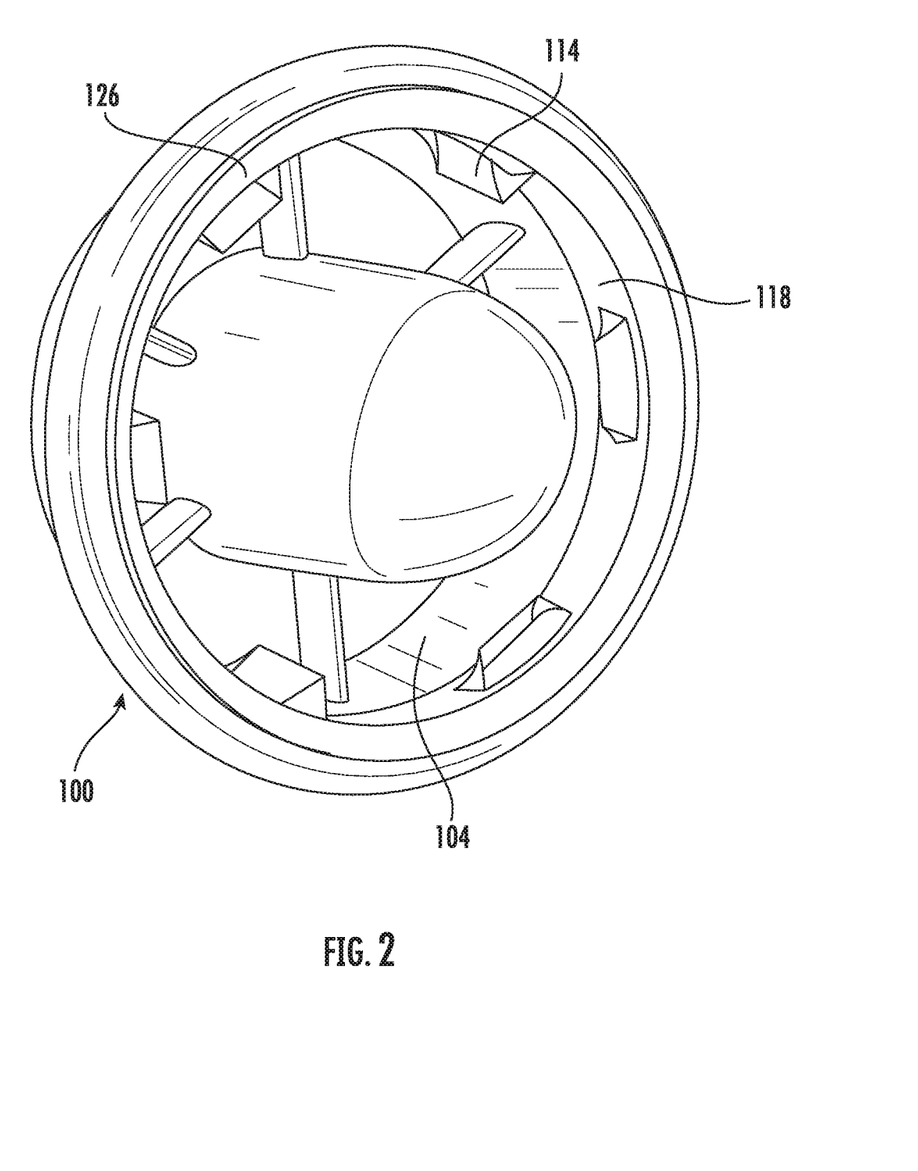
FIG. 2 depicts a perspective view of an exhaust assembly for a turbine engine in accordance with an exemplary embodiment.

Referring to FIGS. 1 and 2, an exhaust assembly 100, according to some embodiments, is shown. The exhaust assembly 100 includes an exhaust frame 102. The exhaust frame 102 includes an outer casing 104, and inner casing 106, and a number of struts 108. The outer casing 104 may have a tube-shaped body that extends along and is coaxial with a longitudinal axis 110 of the exhaust frame 102. The inner casing 106 may also have a tube-shaped body that extends along and is coaxial with the longitudinal axis 110 of the exhaust frame 102. As illustrated in FIG. 1, the outer casing 104 is arranged to be spaced apart from and positioned radially outward from the inner casing 106. The struts 108 connect to the outer casing 104 to the inner casing 106. The exhaust assembly 100 further includes an annular member 112 that includes a plurality of vents 114. The annular member 112 is generally tubular and is configured to have a radius that allows it to be attached at an inner surface to be flush with an outer surface of an end of the outer casing 104. In addition to the vents 114, the annular member 112 includes a plurality of vanes 116 that extend radially inwardly from an inner surface 118 of the annular member 112 and are, in some embodiments, configured to be connected to either the inner casing 106 or a hub 120 that is connected to the inner casing 106. In other embodiments, the annular member 112 includes a plurality of vanes 116 that extend radially inward but only partially span the gap between the inner casing 106 or a hub 120 that is connected to the inner casing 106. In yet other embodiments, the annular member 112 does not include any vanes 118, as shown in FIG. 2.

Figure 4A:
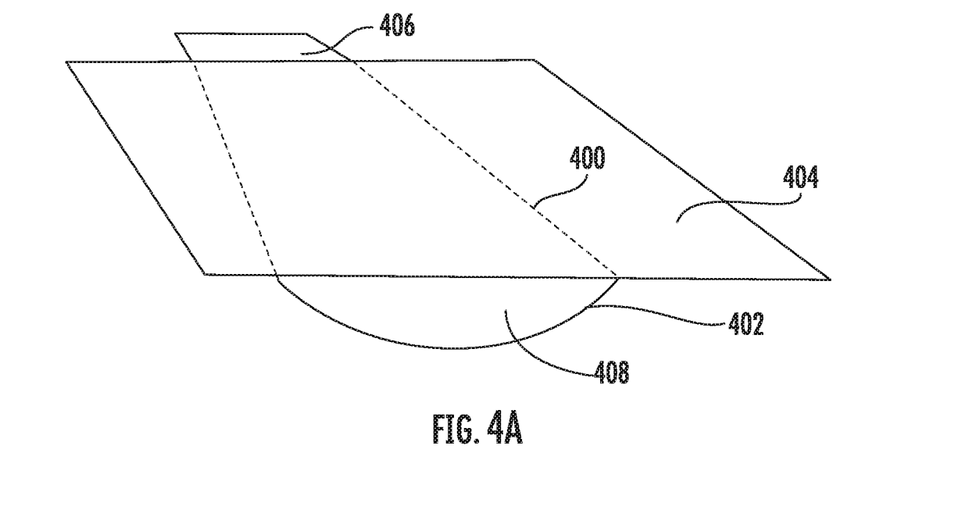
FIG. 4A depicts a perspective view of a vent in accordance with an exemplary embodiment.
Figure 4B:
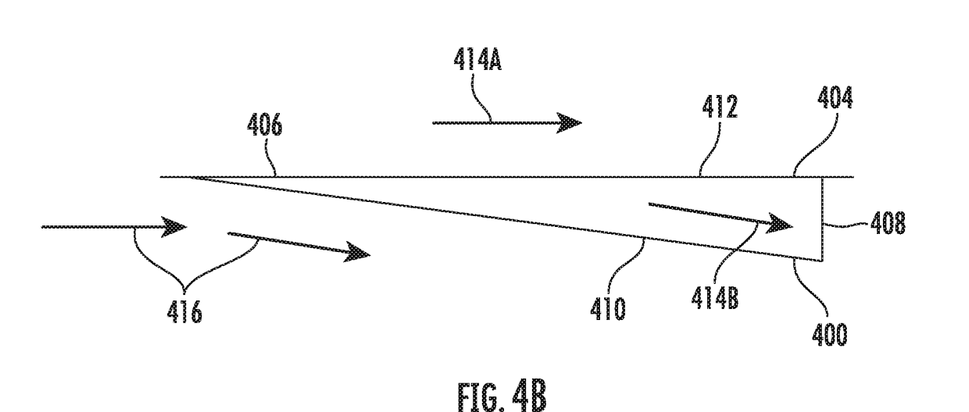
FIG. 4B depicts a cross-sectional view of the vent in accordance with an exemplary embodiment.

Each vent 114 includes an inlet 406 and an outlet 408, as shown on FIG. 4B. The inlet 406 being arranged at the outer surface 122. The outlet 408 being arranged radially inwardly from the inner surface 118 of the annular member 112. Each vent 114 protrudes radially inwardly from the inner surface 118 of the annular member 112 and in the path of a primary exhaust flow 124. The primary exhaust flow 124 is a flow of air that has been received from outside an aircraft 10 and passes through an engine 22. The temperature and speed of the flow of air increases as it passes through an engine 22 due to the engine combustion of fuel and air. The heated flow of air passes across the struts 108 and is expelled into the exhaust duct 128.

An exhaust ejector 126 includes a generally annulus shaped open area defined by the outer surface 122 of the annular member 112 and an inner surface of the exhaust duct 128. The exhaust ejector 126 is configured to direct a portion of the secondary exhaust flow 132A 132B through the exhaust ejector 126 and into the exhaust duct 128. The secondary exhaust flow 132 is a flow of air received from outside of the aircraft 10, but bypasses the engine 22 and is expelled directly into the exhaust duct 128. Although the secondary exhaust flow 132A 132B has a higher temperature than the air from the outside due to passing over the hot engine sections, it is cooler than the primary exhaust flow 124. An aircraft's exhaust system is configured such that the cooler air in the exhaust duct 128 has lower air pressure than the hotter air about the engine area. This results in the air in the higher pressure area around the engine moving toward the lower pressure area in the exhaust duct 128.

During operation, the primary exhaust flow 124 and the secondary exhaust flow 132A 132B flow into the exhaust duct 128. Each vent 114 is arranged within the path of the primary exhaust flow 124 and causes the primary exhaust flow 124 to diverge from its path to flow past the vents 114 prior to reaching the exhaust duct 128. A first portion of the secondary exhaust flow 132A flows through the exhaust ejector 126 and into the exhaust duct 128. A second portion of the secondary exhaust flow 132B is received by the inlet 406 of the vent 114 and is expelled from the outlet 408 into the exhaust duct 128. The second portion 132B is expelled into the exhaust primary flow 124 at a non-linear angle to the direction of the first portion. The angle of the direction of the second portion 132B is based at least in part on an angle of the vent 114 in relation to the inner surface 118 of the annular member 112. Therefore, the vent 114 both manipulates the primary exhaust flow 124 and entrains the secondary exhaust flow 132B. This manipulation results in a higher air pressure gradient between the air in an engine area (not shown) and the air in the exhaust duct 128. The higher pressure gradient results in air being received from the outside and being expelled into the exhaust primary flow 124 at a faster rate than with a conventional exhaust system. This reduces the probability that hot air expelled into the exhaust duct is pulled back into the engine area. The primary exhaust 124, and secondary exhausts 132A 132B further mix in the exhaust duct 128 before the combined flows are expelled into the environment outside the aircraft 10.

Figure 3:
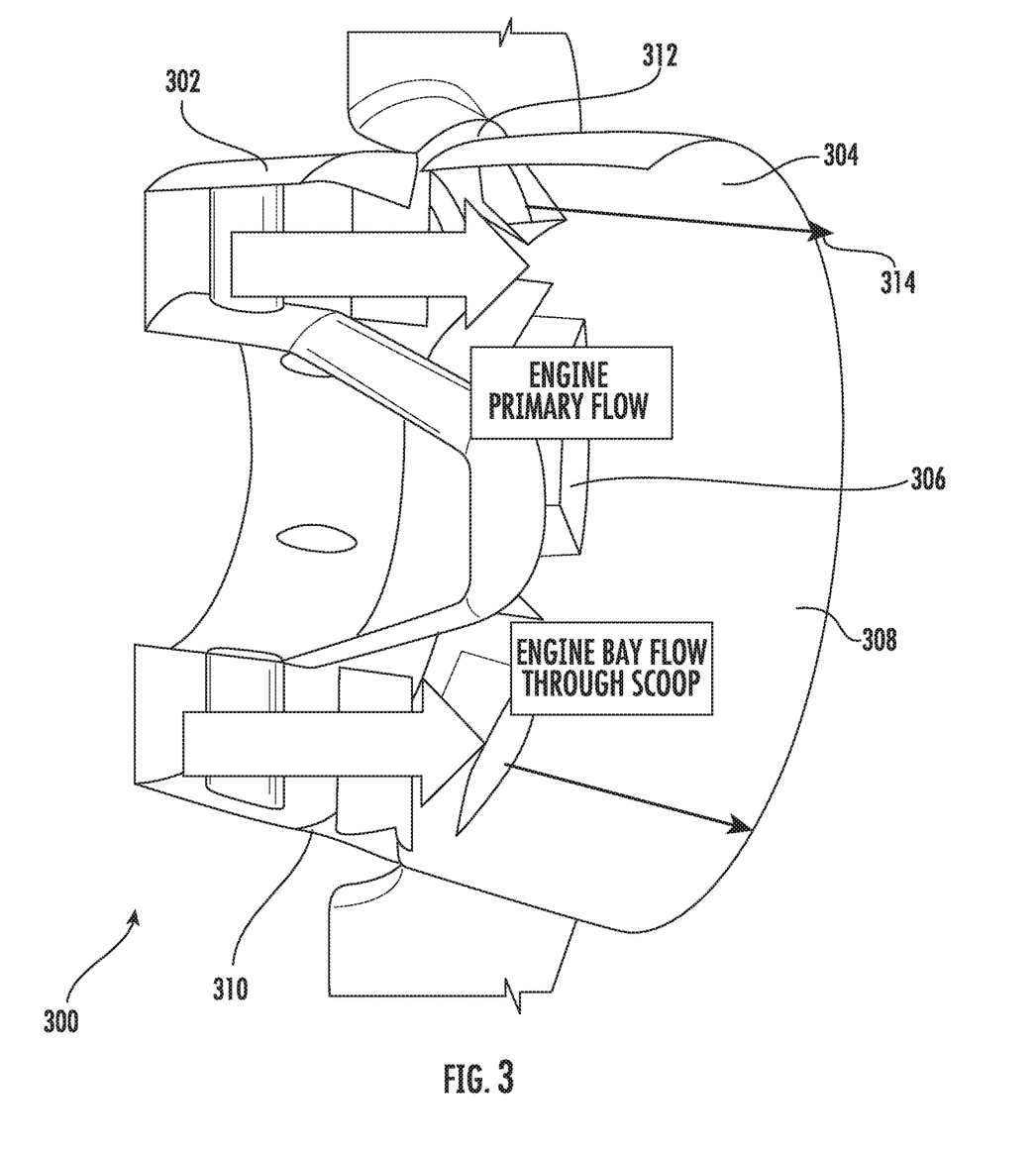
FIG. 3 depicts a cross-sectional view of an exhaust assembly for a turbine engine in accordance with an exemplary embodiment.

Referring to FIG. 3, a cross-sectional diagram of another embodiment of an exhaust assembly 300 is shown. The exhaust frame 302 is attached to an annular member 304. The annular member 304 includes a plurality of vents 306 arranged along a central portion of the annular member 304. The annular member 304 further extends out to form an exhaust duct 308. In other words, the annular member 304 and the exhaust duct 308 are integrally formed and not distinct elements of an exhaust system. A radius of the annular member 304 increases from a proximal end 310 to a housing 312 such that a space between the annular member 304 and the housing is sealed such that there is no open annulus surrounding the annular member 304. Therefore, the entire secondary exhaust flow 314 flows through the vents 306.

A vent profile may vary, as illustrated in FIGS. 4A and 4B. As illustrated in FIG. 4A, a curved vent 400 is defined by a convex surface 402 protruding away from an outer casing 404. The curved vent 400 includes an inlet 406 for receiving a flow of air and an outlet 408 for expelling the flow of air. Referring to FIG. 4B, a cross-section of the curved vent 400 is shown. As illustrated, a bottom surface 410 of the vent 400 forms a non-linear angle with a top surface 412 of the outer casing 404. During operation, a first portion of the secondary exhaust flow 414A flows in a first direction over the outer casing 404. Additionally, a second portion of the secondary exhaust flow 414B is channeled through the curved vent 400 at a non-linear angle to the direction of the first portion of the secondary exhaust flow 414A. Furthermore, the arrangement of the curved vent 400 in a path of the primary exhaust flow 416, causes the primary exhaust flow to be redirected to flow around the curved vent 400.

Figure 5:
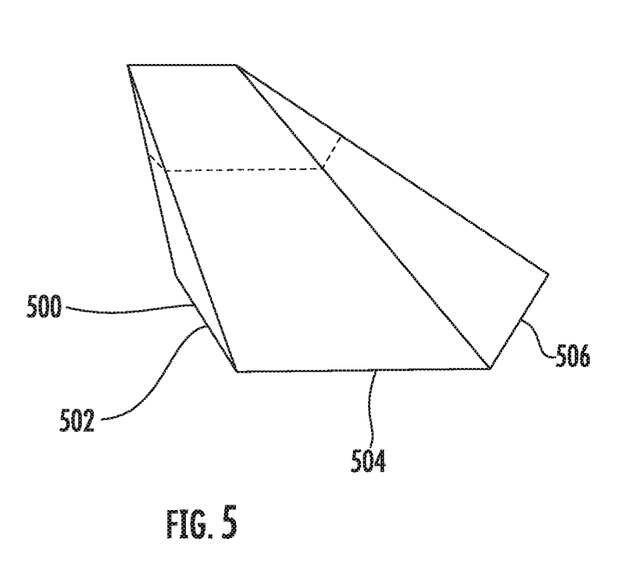
FIG. 5 depicts a perspective view of a vent in accordance with an exemplary embodiment.

Referring to FIG. 5, an embodiment of an angled vent 500 is defined by three planar facets 502 504 506. The first facet 502 is arranged at a non-linear angle to a second facet 504. The second facet 504 is arranged at a non-linear angle to a third facet 504. Each angle may be determined based on a desired outlet shape and a desired flow of air. It should be appreciated that although FIG. 5 illustrates three planar facets 502 504 506, the angled vent 500 may include two or more planar facets. The angled vent 500 may also further include a combination of at least one planar facet and at least one angled surface. It should be appreciated that such planar facets could be replaced by various curved facets. The number of facets, facet contour, and adjoining methodology of the facets are considered different embodiments of the vent designs illustrated in FIGS. 4A, 4B, and 5.

Figure 6:
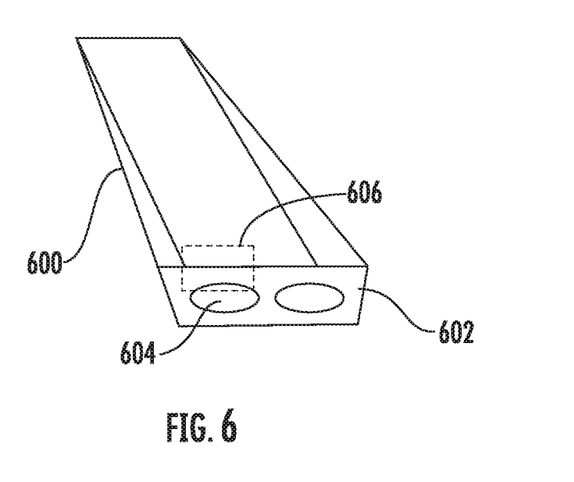
FIG. 6 depicts a perspective view of a vent in accordance with an exemplary embodiment.

Referring to FIG. 6, a guided vent 600 is shown. The guided vent 600 includes an outlet frame 602 that itself includes one or more outlet holes 604. The outlet frame 602 is a barrier that causes a flow of air to be expelled through the outlet hole(s) 604. The outlet hole(s) 604 may have various sizes and shapes of varying complexity based on a desired flow of air. In some embodiments, a movable barrier mechanism 606 may be incorporated to block air from passing through one or more of the outlet hole(s) 604. The movable barrier mechanism 606 may be a flap or a slidable screen. The movable barrier mechanism 606 may include an actuator (not shown) operated by a crew member of the aircraft 10. It should be appreciated that although an angled vent and a curved vent have been illustrated, a vent may include any geometric profile and further include various widths and lengths based at least in part on a desired flow of the primary exhaust flow and secondary exhaust flow.

Figure 7:
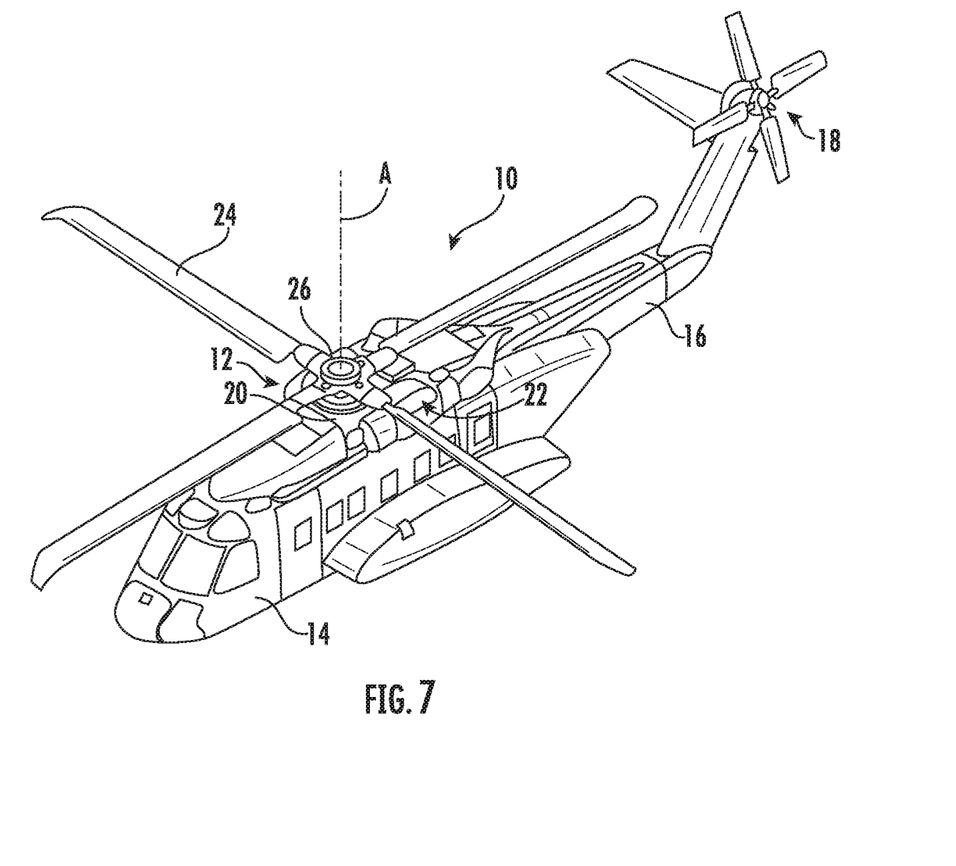
FIG. 7 depicts a schematic side view of a rotary-wing aircraft in accordance with an exemplary embodiment.

With reference now to FIG. 7, an example of a vertical takeoff and landing (VTOL) aircraft is schematically illustrated. The aircraft 10 in the disclosed, non-limiting embodiment includes a main rotor assembly 12 supported by an airframe 14 having an extending tail 16, which mounts an anti-torque system/tail rotor (TR) system 18. The main rotor assembly 12 is driven about an axis of rotation A through a main rotor gearbox (MGB) 20 by one or more engines 22. The engines 22 generate the power available for flight operations and couple such power to the main rotor assembly 12 and the TR system 18 through the MGB 20. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines, or any application with a turbine engine (including axial and centrifugal) that expels a hot exhaust will also benefit herefrom.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An ejector member comprising:
   an annular member;
   a vent arranged at the annular member, the vent comprising:
      an inlet at a first surface of the annular member; and
      an outlet arranged radially inward from a second surface of the annular member,
      wherein the outlet comprises at least three planar facets, and wherein a first of the least three planar facets coincides with and is arranged at a non-linear angle to a second of the at least three planar facets and the second of the at least three planar facets being disposed at a non-linear angle to a third of the three planar facets; and
   a vane extending radially inward from the second surface of the annular member.

2. The ejector member of claim 1, wherein the ejector member further comprises a plurality of vents.

3. The ejector member of claim 2, wherein the ejector member further comprises a plurality of vanes.

4. The ejector member of claim 2, wherein each vent of the plurality of vents has a respective curved surface profile.

5. The ejector member of claim 2, wherein each vent of the plurality of vents has an angled surface profile.

6. The ejector member of claim 3, wherein at least one vane of the plurality of vanes is arranged between a first vent and a second vent.

7. The ejector member of claim 1, wherein the annular member comprises an exhaust duct.

8. An ejector assembly comprising:
   an engine exhaust frame having a first casing and a second casing spaced apart and radially outward from the first casing;
   an annular member attached to the second casing;
   a plurality of vents arranged at the annular member, each vent comprising:
      an inlet at a first surface of the annular member; and
      an outlet arranged radially inward from a second surface of the annular member, wherein the outlet comprises at least three planar facets, and wherein a first of the least three planar facets coincides with and is arranged at a non-linear angle to a second of the at least three planar facets and the second of the at least three planar facets being disposed at a non-linear angle to a third of the three planar facets; and
a plurality of vanes extending radially inward from the second surface of the annular member.

9. The ejector assembly of claim 8, wherein the second casing has a tube-shaped body that extends along and is coaxial with a longitudinal axis of the engine exhaust frame.

10. The ejector assembly of claim 9, wherein the first casing has a tube-shaped body that extends along and is coaxial with the longitudinal axis of the engine exhaust frame.

11. The ejector assembly of claim 10, wherein the annular member comprises an exhaust duct.

12. The ejector assembly of claim 8, wherein each vane of the plurality of vanes is attached to the first casing.

13. The ejector assembly of claim 1, further comprising a hub connected to the first casing.

14. A rotary-wing aircraft comprising:
a rotor;
a turbine engine for driving the rotor;
an exhaust system for receiving an exhaust flow from the turbine engine; the exhaust system comprising:
an engine exhaust frame; and
an engine exhaust frame having a first casing and a second casing spaced apart and radially outward from the first casing;
an annular member attached to the second casing;
a plurality of vents arranged at the annular member, each vent comprising:
a first surface of the annular member; and
an outlet arranged radially inward from a second surface of the annular member,
wherein the outlet comprises at least three planar facets, and wherein a first of the least three planar facets coincides with and is arranged at a non-linear angle to a second of the at least three planar facets and the second of the at least three planar facets being disposed at a non-linear angle to a third of the three planar facets; and
a plurality of vanes extending radially inward from the second surface of the annular member.

15. The rotary-wing aircraft of claim 14, wherein the second casing has a tube-shaped body that extends along and is coaxial with a longitudinal axis of the engine exhaust frame.

16. The rotary-wing aircraft of claim 13, wherein the first casing has a tube-shaped body that extends along and is coaxial with the longitudinal axis of the engine exhaust frame.

17. The rotary-wing aircraft of claim 15, wherein each vent of the plurality of vents is arranged equidistant from an adjacent vent.

18. The rotary-wing aircraft of claim 14, wherein the annular member comprises an exhaust duct.

19. The rotary-wing aircraft of claim 18, wherein the exhaust system further comprises a barrier mechanism operable to block an outlet hole.

20. The rotary-wing aircraft of claim 14, further comprising:
a translational thrust system; and
a propeller rotor operable to be driven by the turbine engine.

* * * * *